United States Patent
Liu

(10) Patent No.: US 12,066,887 B2
(45) Date of Patent: Aug. 20, 2024

(54) REDUCING CRYPTOGRAPHIC UPDATE ERRORS IN MEMORY DEVICES USING CYCLICAL REDUNDANCY CHECKS

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 35 days.

(21) Appl. No.: 17/887,346

(22) Filed: Aug. 12, 2022

(65) Prior Publication Data

US 2024/0054045 A1 Feb. 15, 2024

(51) Int. Cl.
*G06F 11/10* (2006.01)
*G06F 11/07* (2006.01)
*G06F 21/60* (2013.01)
*G06F 21/64* (2013.01)

(52) U.S. Cl.
CPC ...... *G06F 11/1004* (2013.01); *G06F 11/0772* (2013.01); *G06F 21/602* (2013.01); *G06F 21/64* (2013.01)

(58) Field of Classification Search
CPC .. G06F 11/1004; G06F 11/0772; G06F 21/64; G06F 21/602
See application file for complete search history.

(56) References Cited

U.S. PATENT DOCUMENTS

2016/0085692 A1* 3/2016 Kwok ............... G06F 21/79 713/193
2021/0312055 A1* 10/2021 Kloth ............... H04L 9/0894

* cited by examiner

*Primary Examiner* — Samir W Rizk
(74) *Attorney, Agent, or Firm* — Greenberg Traurig

(57) ABSTRACT

In some aspects, the techniques described herein relate to a system including: a memory device including a secure storage area; a server configured to generate cryptographic data and compute a cyclical redundancy check (CRC) value of the cryptographic data; and a manufacturer computing device configured to receive the cryptographic data and the CRC value and issue a command including the cryptographic data and the CRC value to the memory device, wherein the memory device is configured to compute a local CRC value using the cryptographic data in the command, compare the local CRC value to the CRC value, and write the cryptographic data to the secure storage area when the local CRC value matches the CRC value.

20 Claims, 7 Drawing Sheets

US 12,066,887 B2

REDUCING CRYPTOGRAPHIC UPDATE ERRORS IN MEMORY DEVICES USING CYCLICAL REDUNDANCY CHECKS

FIELD OF THE TECHNOLOGY

At least some embodiments disclosed herein relate generally to memory devices (e.g., semiconductor memory devices) and, in particular, to improvements in cryptographic data storage on secure memory devices.

BACKGROUND

Some memory devices may store cryptographic data (e.g., keys) to perform cryptographic operations. Some such secure memory devices may use stored cryptographic data to validate sensitive data (e.g., secure commands, digital signatures, etc.) that are signed using corresponding cryptographic data. If the underlying content of the cryptographic data is corrupted, current secure memory devices do not provide mechanisms to prevent the writing of an invalid cryptographic data. As such, if invalid cryptographic data is validly provided to such a secure memory device, the invalid cryptographic data will be persisted, resulting in a malfunctioning or unusable memory device.

DETAILED DESCRIPTION

Figure 1:
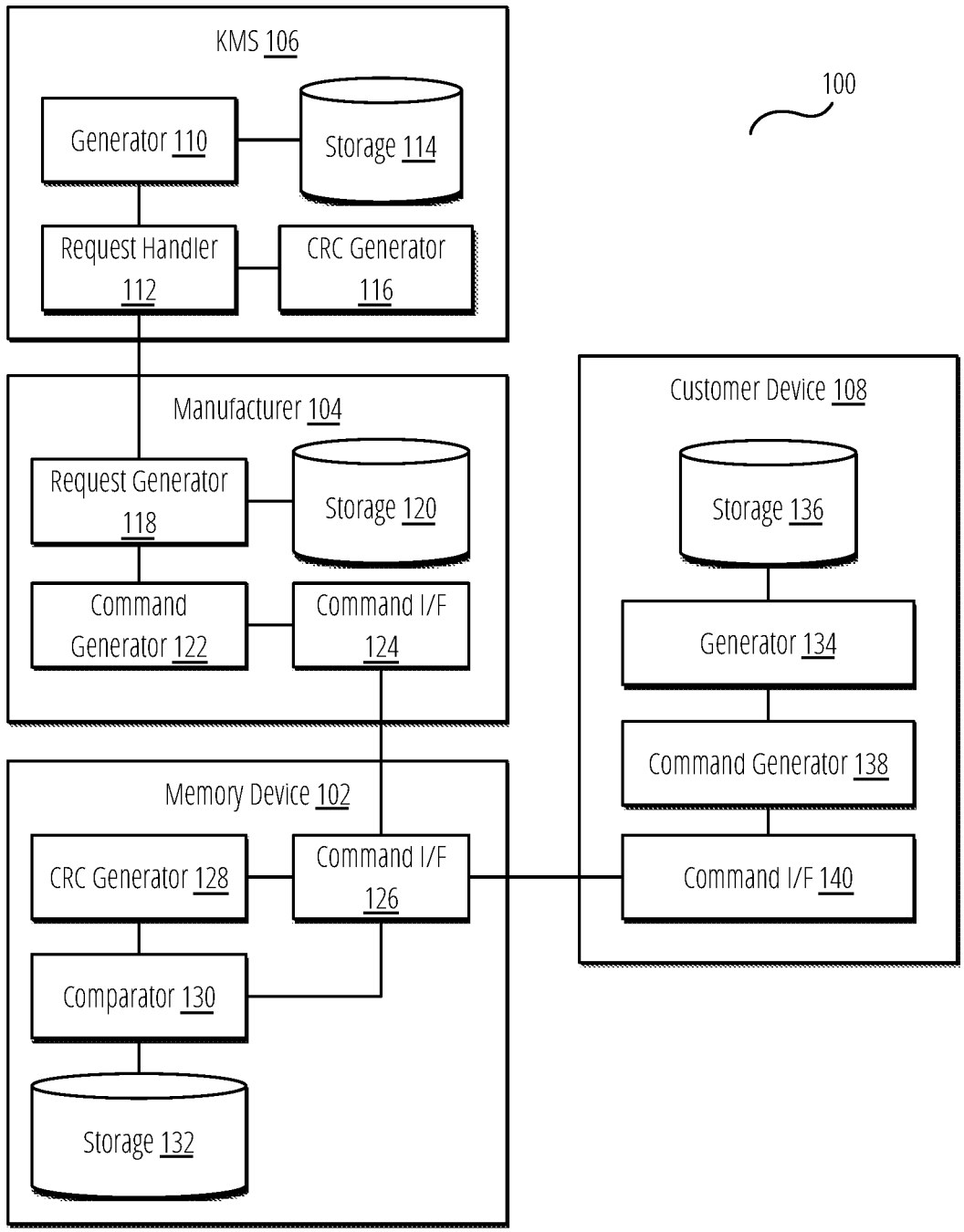
FIG. 1 is a block diagram of a computing system

Memory devices, especially secure memory devices, store cryptographic data (e.g., asymmetric keys, symmetric keys, etc.). This data can be injected by a manufacturer and updated by customers in the field. As such, these devices are frequently receiving critical cryptographic data and storing this data for use in downstream applications. If any errors are introduced between the generation of this cryptographic data and its ultimate storage in a memory device, the memory device may be non-functional. For example, the memory device may use a locally injected public key to validate secure commands (signed using the corresponding private key held by an authorized party). Such secure commands can include a command to replace a public key (thus transferring ownership of the device). If the local injected public key is corrupt (e.g., is corrupted during transmission or is encoded using the wrong Endian), the owner of the proper private key cannot generate a signature that can be validated by the memory device. As such, the memory device is "stuck" using an invalid public key and thus is not usable by a customer. In existing systems, such a memory device would have to be physically returned to a manufacturer for erasing and re-injecting cryptographic data.

The disclosure describes various solutions to these technical problems. In brief, a server, such as a key management server (KMS), can generate cryptographic data (e.g., cryptographic keys) and compute a CRC value for the cryptographic data. The KMS transmits the cryptographic data and the CRC value(s) to a manufacturer which injects the cryptographic data into the memory device. During this injection, the manufacturer also provides the CRC generated by the KMS. When the memory device detects the injected cryptographic data, it recomputes a local CRC value and compares the local CRC value to the manufacture-provided CRC value. If the values match, the memory device returns a successful response and persists the cryptographic data. If the values do not match, the memory device returns a failure response. The manufacturer can then take remedial actions such as changing the Endian of the cryptographic data, requesting new cryptographic data, etc. The manufacturer can attempt to inject the cryptographic again, until successfully injecting the cryptographic data.

Similarly, a customer can generate their own cryptographic data and CRC value and write the cryptographic data to the memory device. In this scenario, the customer can request that the current holder of a private key corresponding to a public key sign the command. The memory device can first verify the signature and if the signature is valid, can then recompute a local CRC value and compare the local CRC value to the customer-provided CRC value. If the values match, the memory device returns a successful response and persists the cryptographic data. If the values do not match, the memory device returns a failure response. The customer can then take remedial actions such as changing the Endian of the cryptographic data, requesting new cryptographic data, etc. The customer can attempt to write the cryptographic again, until successfully writing the cryptographic data.

In some aspects, the techniques described herein relate to a system including: a memory device including a secure storage area; a server configured to generate cryptographic data and compute a cyclical redundancy check (CRC) value of the cryptographic data; and a manufacturer computing device configured to receive the cryptographic data and the CRC value and issue a command including the cryptographic data and the CRC value to the memory device, wherein the memory device is configured to compute a local CRC value using the cryptographic data in the command, compare the local CRC value to the CRC value, and write the cryptographic data to the secure storage area when the local CRC value matches the CRC value.

In some aspects, the techniques described herein relate to a system, wherein the cryptographic data includes a cryptographic key.

In some aspects, the techniques described herein relate to a system, wherein the manufacturer computing device is further configured to detect a failure response associated with the command, request second cryptographic data and a second CRC value from the server in response to the failure response, and issue a second command including the second cryptographic data and the second CRC value to the memory device.

In some aspects, the techniques described herein relate to a system further including a customer computing device, the customer computing device configured to: generate second cryptographic data and a second CRC value corresponding to the second cryptographic data; and issue a second command including the second cryptographic data and the second CRC value to the memory device; wherein the memory device is configured to compute a second local CRC value using the second cryptographic data in the second command, compare the second local CRC value to the second CRC value, and write the second cryptographic data to the secure storage area if the second local CRC value is equal to the second CRC value.

In some aspects, the techniques described herein relate to a system, wherein the customer computing device is further configured to include a signature in the second command.

In some aspects, the techniques described herein relate to a system, wherein writing the second cryptographic data to the secure storage area includes overwriting existing cryptographic data.

In some aspects, the techniques described herein relate to a system, wherein the memory device is further configured to determine that the local CRC value does not match the CRC value and, in response, not write the cryptographic data to the secure storage area.

In some aspects, the techniques described herein relate to a system, wherein the memory device returns a failure response in response to determining that the local CRC value does not match the CRC value.

In some aspects, the techniques described herein relate to a method including: receiving, by a memory device, a command including cryptographic data and a CRC value of the cryptographic data; generating, by the memory device, a local CRC value using the cryptographic data; determining, by the memory device, whether the local CRC value matches the CRC value included in the command; writing, by the memory device, the cryptographic data to a secure storage area if the local CRC value matches the CRC value included in the command; and returning, by the memory device, a failure response if the local CRC value does not match the CRC value included in the command.

In some aspects, the techniques described herein relate to a method, wherein the cryptographic data includes one of a public key, a private key, a symmetric key, and a Unique Device Secret.

In some aspects, the techniques described herein relate to a method, wherein determining whether the local CRC value matches the CRC value included in the command includes determining if the local CRC value is equal to the CRC value included in the command.

In some aspects, the techniques described herein relate to a method, wherein writing the cryptographic data to a secure storage area includes overwriting existing cryptographic data stored in the secure storage area.

In some aspects, the techniques described herein relate to a method, further including extracting a digital signature from the command and validating the digital signature using the existing cryptographic data.

In some aspects, the techniques described herein relate to a method, wherein returning a failure response includes returning failure response data as part of the failure response.

In some aspects, the techniques described herein relate to a non-transitory computer-readable storage medium for tangibly storing computer program instructions capable of being executed by a computer processor, the computer program instructions defining steps of: receiving, by a memory device, a command including cryptographic data and a CRC value of the cryptographic data; generating, by the memory device, a local CRC value using the cryptographic data; determining, by the memory device, whether the local CRC value matches the CRC value included in the command; writing, by the memory device, the cryptographic data to a secure storage area if the local CRC value matches the CRC value included in the command; and returning, by the memory device, a failure response if the local CRC value does not match the CRC value included in the command.

In some aspects, the techniques described herein relate to a non-transitory computer-readable storage medium, wherein the cryptographic data includes one of a public key, a private key, a symmetric key, and a Unique Device Secret.

In some aspects, the techniques described herein relate to a non-transitory computer-readable storage medium, wherein determining whether the local CRC value matches the CRC value included in the command includes determining if the local CRC value is equal to the CRC value included in the command.

In some aspects, the techniques described herein relate to a non-transitory computer-readable storage medium, wherein writing the cryptographic data to a secure storage area includes overwriting existing cryptographic data stored in the secure storage area.

In some aspects, the techniques described herein relate to a non-transitory computer-readable storage medium, further including extracting a digital signature from the command and validating the digital signature using the existing cryptographic data.

In some aspects, the techniques described herein relate to a non-transitory computer-readable storage medium, wherein returning a failure response includes returning failure response data as part of the failure response.

FIG. 1 is a block diagram of a computing system.

The system 100 includes a memory device 102, manufacturer 104, KMS 106, and customer device 108. The memory device 102, manufacturer 104, KMS 106, and customer device 108 can be implemented as one or more computing devices. For example, memory device 102 may be implemented similar to computing system 600, while manufacturer 104, KMS 106, and customer device 108 may be implemented as one or more computing devices such as device 700. Operational and other details of the KMS 106, manufacturer 104, memory device 102, and customer device 108 are also described in connection with FIGS. 2 through 5, respectively, and those details are incorporated herein in their entirety.

In the system 100, the KMS 106 includes a request handler 112. In some implementations, the request handler 112 can include a secure Hypertext Transport Protocol (HTTP) server that can receive network requests using a secure transport layer security (TLS) protocol. One such request includes a cryptographic data request which causes the KMS 106 to generate cryptographic data as described in more detail herein.

In response to a cryptographic data request, the request handler 112 instructs the cryptographic data generator 110 to generate cryptographic data. Details of this generation are provided in FIG. 2 and not repeated herein. In brief, the cryptographic data can comprise a cryptographic key generated using a well-defined algorithm such as a Diffie-Hellman (DH), Elliptic Curve Digital Signature Algorithm (ECDSA), Elliptic-curve Diffie-Hellman (ECDH), Rivest-Shamir-Adleman (RSA), or similar type of algorithm. The specific type of algorithm is not limiting. The cryptographic data can also include other types of cryptographic primitives such as a Unique Device Secret, symmetric key, hash value, etc. Further, in some implementations, non-cryptographic data can be used in lieu of cryptographic data.

The cryptographic data generator 110 can persist cryptographic data in a secure storage area such as cryptographic data storage 114. In some implementations, the cryptographic data storage 114 can be a secure storage device such as a hardware security module (HSM) or similar type of device. The request handler 112 can receive the generated cryptographic data and generate a CRC value using a CRC generator 116. The CRC generator 116 can include any well-known CRC algorithm that calculates a CRC value for cryptographic data. The request handler 112 can combine the include the cryptographic data generated by cryptographic data generator 110 and the CRC generated by CRC generator 116 into a response and return the response to the calling party (e.g., manufacturer 104).

The manufacturer 104 includes a request generator 118 capable of generating and issuing a request for cryptographic data from the KMS 106. As discussed in FIG. 2, the request can include various parameters controlling the cryptographic data generation process, which are not repeated herein. Upon receiving cryptographic data and a CRC value from the KMS 106, the request generator 118 can store the cryptographic data in a cryptographic data storage 120. As with cryptographic data storage 114, the cryptographic data storage 120 can comprise an HSM or similar device. The manufacturer 104 also includes a command generator 122, which can generate commands processible by the memory device 102. As discussed in FIG. 3, this command can be a manufacturing command that is only available when the memory device 102 is being manufactured. The command further can include the cryptographic data and the CRC value received from the KMS 106. The manufacturer 104 can communicate with the memory device 102 via a command interface 124, which can comprise (for example) a serial peripheral interface (SPI), universal asynchronous receiver-transmitter (UART) interface, peripheral component interconnect express (PCIe), wireless fidelity (Wi-Fi), Ethernet, or another type of interface. As discussed in FIG. 3, the manufacturer 104 issues a command to write cryptographic data to the memory device 102 and awaits a response. Based on the response, manufacturer 104 can determine whether the cryptographic data was written or if remedial measures should be taken.

The memory device 102 includes a command interface 126 corresponding to the command interface 124. The memory device 102 receives commands over the command interface 126, including the command to write cryptographic data. In response to such a command, a CRC generator 128 generates a local CRC value using the received cryptographic data in the command, and a comparator 130 compares the local CRC value to the CRC value included in the command. If the two CRC values match (e.g., are equal), the memory device 102 can write the cryptographic data to a secure storage area 132 of the memory device 102 (e.g., an HSM). In some scenarios, this write can result in overwriting existing cryptographic data. The memory device 102 is then further able to return a response to the memory device 102 (or customer device 108) based on the command indicating whether the write was performed and successful or whether a failure occurred.

The system 100 can also include a customer device 108 that can write their own cryptographic data to the memory device 102. Customer device 108 includes a cryptographic data and CRC generator 134, which functions similarly to cryptographic data generator 110 and CRC generator 116. In some implementations, the algorithm used by cryptographic data and CRC generator 134 is the same as that used by cryptographic data generator 110 and CRC generator 116; however, this is not required. After generating cryptographic data, customer device 108 can store the cryptographic data in cryptographic data storage 136 (e.g., an HSM). Customer device 108 also can generate a command via the command generator 138, which operates similar to command generator 122. Command generator 138 differs from command generator 122 in that it can only generate valid commands after manufacturing. In some implementations, these commands can include a replace cryptographic data command that allows the customer device 108 to replace existing cryptographic data. In some implementations, the replace cryptographic data command can be signed by the KMS 106 using a private key corresponding to a public key stored in secure storage area 132. Customer device 108 can issue the command to the memory device via a command interface 140 and await a success or failure response. Upon a successful response, the memory device 102 will update its cryptographic data with the cryptographic data generated by customer device 108.

Figure 2:
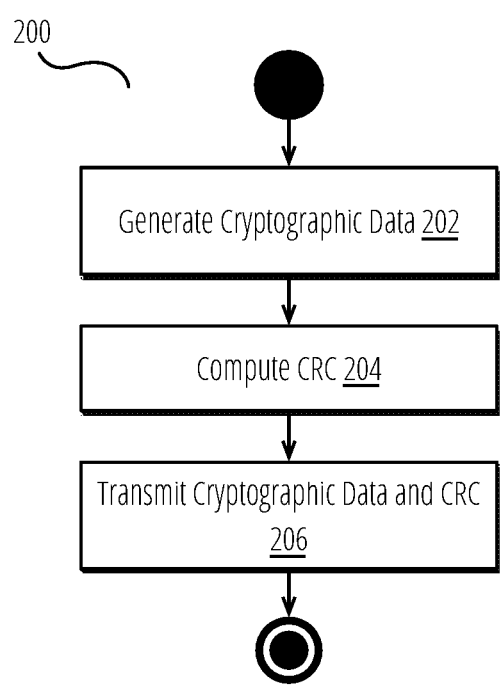
FIG. 2 is a flow diagram illustrating a method for generating cryptographic data with a cyclical redundancy check (CRC) value.

FIG. 2 is a flow diagram illustrating a method for generating cryptographic data with a cyclical redundancy check (CRC) value.

In step 202, method 200 can include generating cryptographic data. In some implementations, method 200 can be performed by a server such as a KMS or similar type of server.

In some implementations, method 200 can be initiated by a manufacturer (or customer) issuing a request for cryptographic data. For example, a manufacturer or customer may generate an issue request for cryptographic data (such as a cryptographic key). Method 200 can receive the request via, for example, a secure network interface (e.g., secure Hypertext Transport Protocol request). In some implementations, a user or device submitting a request may be authenticated prior to method 200 executing. For example, a user or manufacturer may authenticate to the device executing method 200 via a login or other type of authentication mechanism, which is non-limiting. The request can include parameters describing the request such as the intended use of the cryptographic data, algorithm type, etc., all of which are non-limiting. Alternatively, the request can include no such parameters and the device executing method 200 can operate using default parameters.

In some implementations, method 200 can execute a key generation algorithm to generate a key. The key generally may be a cryptographic key. In some implementations, the key may be a symmetric key. However, in other implementations, the key may be part of an asymmetric key pair. In this implementation, the key generated in step 202 can include a public key and a corresponding private key. However, in the following steps, references to a "key" generally refer to a public key in an asymmetric key implementation unless explicitly noted otherwise. However, in some embodiments, private keys, Unique Device Secrets (in a Device Identity Composition Engine, DICE, system), or other cryptographic or sensitive data may be used instead. The disclosure does not limit the type of algorithm used to generate a key and various types of algorithms and protocols (e.g., Diffie-Hellman, Elliptic Curve Diffie-Hellman, Elliptic Curve Digital Signature Algorithm) can be used. As discussed above, step 202 can include generating multiple keys. For example, method 200 can be extended to operate in a batch mode whereby a single key request can be used to receive multiple keys. In such a mode, the key request can include the number of keys to generate. Such a batch mode may be useful for manufacturers performing bulk provisioning of memory devices. Further, as another example, the key request can include a request for multiple, different types of keys (e.g., used for different purposes). Thus, method 200 can be extended to generate multiple types of keys in response to such a request.

In step 204, method 200 can include computing a CRC value for the cryptographic data.

In some implementations, various CRCs can be used to compute the CRC value such as a parity bit (CRC-1), CRC-16, CRC-32, CRC-64, etc. In other implementations, various checksum algorithms can be used in lieu of a CRC algorithms. For example, method 200 can use an Internet checksum, Fletcher checksum, etc. In some implementations, the choice of algorithm can be made based on the endian-ness of the cryptographic data. That is, if the cryptographic data is big-endian, a big-endian checksum or CRC algorithm may be used.

In step 206, method 200 can include transmitting the cryptographic data and the CRC (e.g., as a response to a request).

In some implementations, the returned key can be either a symmetric key or a public key portion of an asymmetric key pair, as discussed previously. In some implementations, the response includes a single key and a corresponding CRC value generated in step 204. In other implementations, when multiple keys are generated, the response can be represented as a dictionary or map structure mapping keys to CRC values. Other data structures may be used. Method 200 can transmit the key(s) and CRC value(s) as a response to the request received in step 202. Thus, as one example, the response can be an HTTPS response to an HTTP request including the request. Other network protocols may be used.

In some implementations, method 200 can optionally include storing the cryptographic data and CRC value.

In most implementations, the device executing method 200 will store the generated cryptographic data and CRC values; however, this may not be required. In one implementation, method 200 can include securely storing the cryptographic data and CRC values in, for example, an HSM or similar type of data storage device. Method 200 can include associating the cryptographic data and CRC values with an account associated with the request to enable retrieval by the same user or account. In some implementations, method 200 may only include storing the cryptographic data (and associated accounts) and may not include storing the CRC values. In this implementation, method 200 can include re-generating a CRC value if needed in the future using the stored cryptographic data.

In the foregoing method 200, a KMS (or other device) executing method 200 can thus manage all cryptographic data and corresponding CRC values on behalf of requesting users (e.g., manufacturers). As will be discussed next, cryptographic data can be installed in memory device or another type of semiconductor devices and used for cryptographic operations.

Figure 3:
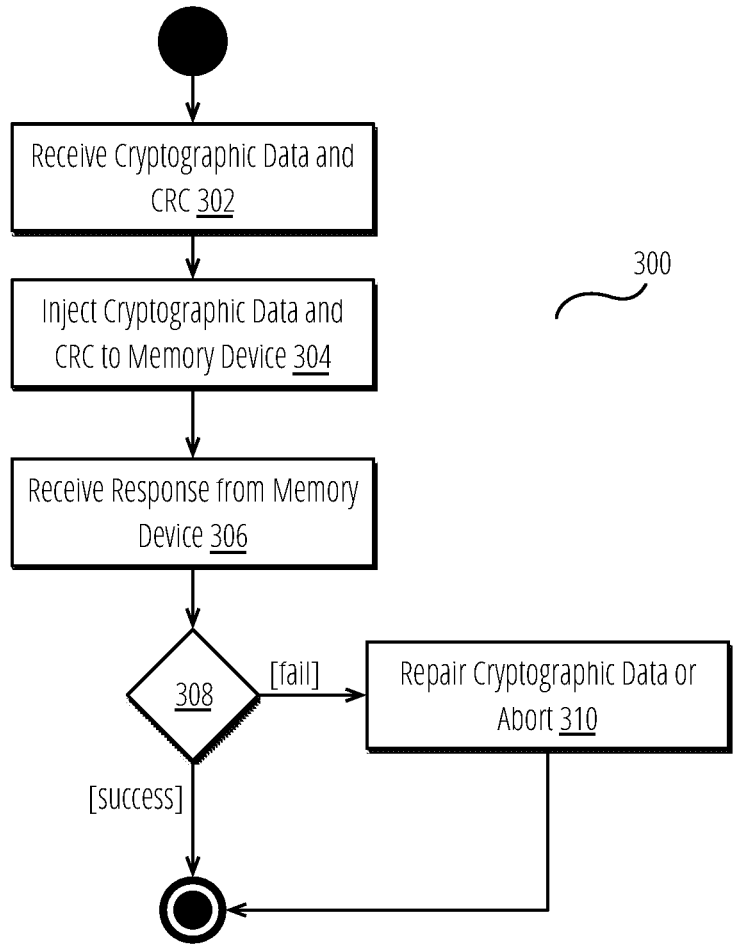
FIG. 3 is a flow diagram illustrating a method for provisioning a memory device with cryptographic data.

FIG. 3 is a flow diagram illustrating a method for provisioning a memory device with cryptographic data. A manufacturer computing device (such as manufacturer 104 in FIG. 1) may execute method 300.

In step 302, method 300 can include receiving cryptographic data and a corresponding CRC value. In step 302, method 300 can include issuing a request to a KMS and receiving the cryptographic data and CRC value from the KMS in response. Details of this request were provided in the description of FIG. 2 and are not repeated herein.

In step 304, method 300 can include injecting the cryptographic data and the CRC value to a memory device.

In some implementations, step 304 can include issuing a command to a memory device, the command including the cryptographic data and the CRC value. In an implementation, the command can be a manufacturer's command that is only capable of being issued while the memory device is possessed by the manufacturer. Such a command may be replaced with a NOOP command once the memory device is released from manufacturing. Specifically, in step 304, the memory device may not include any cryptographic data and thus the command issued in step 304 may only be enabled in a secure environment and then removed from the instruction set of the memory device.

In step 306, method 300 can include receiving a response from the memory device. In some implementations, the response may be a success or failure response indicating whether the command was successful. In some implementations, the command is successful if the memory device has written the cryptographic data in the command from step 304 (including both new writes as well as overwriting an existing cryptographic data). In some implementations, a command fails if the memory device does not write the cryptographic data for some reason. As discussed more in FIG. 4, one such reason is that the CRC value cannot be validated. Other reasons may also raise failures, including command malformation, cryptographic data length errors, etc.

In step 308, method 300 can include determining if the response indicates a success or failure. If the injection was successful, method 300 can end. However, if the injection failed, method 300 can proceed to step 310 where method 300 can include repairing the cryptographic data and/or aborting the injection.

As discussed above, a failure can arise under many conditions, however one such condition is that the CRC value provided in the command cannot be validated. As will be discussed in FIG. 4, the memory device recomputes its own CRC value to confirm that the data it has received is valid. If this comparison fails, the command fails and a failure response is transmitted.

When faced with a failure state, method 300 may take various actions. In one implementation, method 300 can simply abort. In another implementation, method 300 may include displaying an error message (or another indicator) to a human operator to indicate that the command failed. Ultimately, the choice of user interface may be left to the implementation of method 300. In general, however, this option represents an attempt to write the cryptographic data and then prompt for assistance if the write fails. As another alternative, method 300 can attempt to perform various corrections on the cryptographic data and re-execute. For example, method 300 can change the Endianness of the cryptographic data and re-execute. Such common errors may be enumerated and method 300 re-executed for each type of error.

By contrast, in another implementation, method 300 may request new cryptographic data from the KMS and return to step 302 and effectively re-execute itself. That is, method 300 can request new cryptographic data and a CRC value from the KMS and attempt to write the new cryptographic data and CRC value to the memory device using the foregoing process. In some implementations, method 300 can re-execute like this until a successful response is received. However, in other implementations, method 300 may only re-execute itself a limited number of times. For example, method 300 may only attempt to request new cryptographic data and write this new cryptographic data five times. Generally, sporadic errors in the cryptographic data or CRC value are likely caused by corruption (e.g., Endianness switch) during network transmission or command transmissions and are very unlikely. Thus, in practice, method 300 may only need re-execute once to successfully write the cryptographic data. However, if repeated errors occur, such errors may be caused by more fundamental errors in the process (e.g., Endianness errors). In such a scenario, part of the foregoing processes of FIGS. 2 and 3 (and, as will be discussed, FIG. 4) includes a bug or other flaw that needs to be addressed. As such, method 300 may only re-execute a fixed number of times before ending (and alerting a user of a potential fault in the system).

Figure 4:
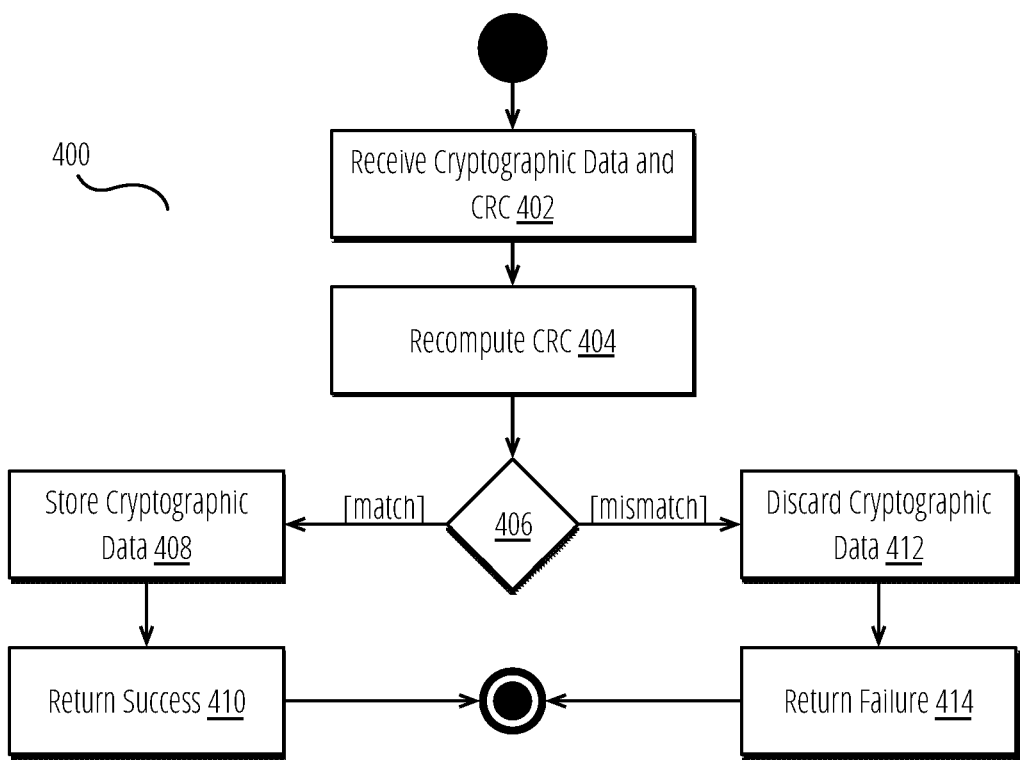
FIG. 4 is a flow diagram illustrating a method for verifying cryptographic data by a memory device.

FIG. 4 is a flow diagram illustrating a method for verifying cryptographic data by a memory device. A memory device (such as memory device 102 in FIG. 1) may execute method 400.

In step 402, method 400 can include receiving cryptographic data and a CRC value.

In some implementations, the cryptographic data and a CRC value can be received as part of a command. In some implementations, the command may be signed using a private key corresponding to a public key stored by the memory device and method 400 can include validating the signature prior to proceeding. Such an implementation may be used with customer-issued commands. By contrast, in other implementations, the command may be unsigned and issued by a manufacturer using a secure command (discussed above).

In some implementations, the command can include cryptographic data and a CRC value. Details of the cryptographic data and CRC value have been described previously and are not repeated herein. In brief, the cryptographic data can comprise a public key or symmetric key (or similar cryptographic data) and the CRC value includes a value computed using the cryptographic data as an input.

In step 404, method 400 can include recomputing a local CRC value using the cryptographic data. In this step, method 400 independently computes a CRC value using the cryptographic data included in the command received in step 402. No limitation is placed on the type of CRC or checksum algorithm, as discussed in FIG. 2. However, in most implementations, the CRC algorithm used in step 404 should match the CRC algorithm used in step 204 of FIG. 2.

In step 406, method 400 can include determining if the local CRC value matches the CRC value received in step 402. In general, the comparison includes a strict comparison to determine if the local CRC value and the received CRC value are bytewise identical. In other implementations, step 406 can include a fuzzy match to allow for minor discrepancies between CRC values.

If the local CRC value matches the CRC value received in step 402, method 400 can include storing the cryptographic data in step 408 and returning a success status in step 410. In some implementations, method 400 can write cryptographic data to a secure storage area of the memory device and subsequently used for cryptographic operations performed by the memory device (e.g., signature validation). In some scenarios, the writing of the cryptographic data can include overwriting existing cryptographic data. In such a scenario, the overwriting of cryptographic data may operate as an ownership transfer of the device (since, as an example, only the owner of the private key cryptographic data can sign data that can be validated by the memory device). Finally, after writing cryptographic data to the secure storage area, method 400 returns a success response, indicating that the write was successful, as discussed with respect to FIG. 3.

If the local CRC value does not match the CRC value received in step 402, method 400 can include discarding the cryptographic data in step 412 and returning a failure status in step 414. In some implementations, the failure can comprise a flag or other data structure indicating a failure. In other implementations, the memory device can attempt to provide further failure response data regarding the failure. In general, the memory device only has access to two CRC values: the local and remote CRC values. Thus, the memory device may be limited in the detail of error messages provided. However, the memory device can still provide useful information that can be used by the calling party. For example, the memory device can provide the two number of unmatching bits between the two CRC values. If a local CRC value is computed on a different input than the received CRC value, this value will be high, frequently most or all of the bits. By contrast, if the received CRC value was malformed during transmission, only a few bits may be mismatched. In response, a calling party can make decisions on how best to retry (as discussed).

Figure 5:
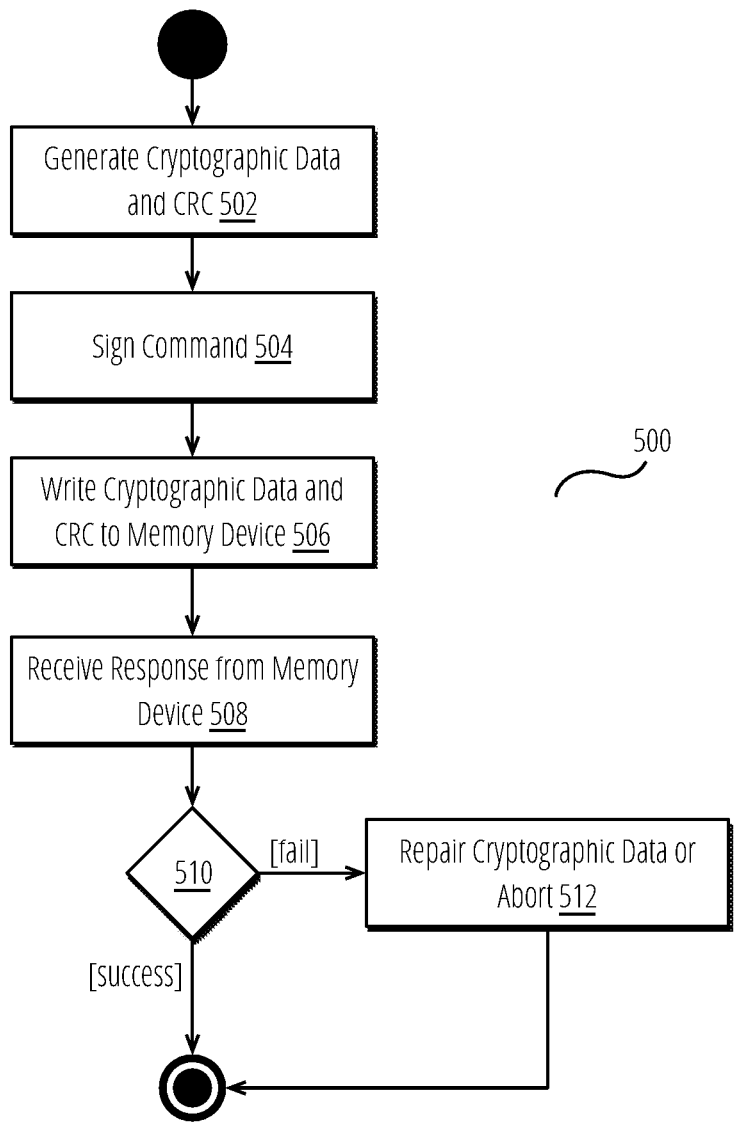
FIG. 5 is a flow diagram illustrating a method for replacing cryptographic data in a memory device.

FIG. 5 is a flow diagram illustrating a method for replacing cryptographic data in a memory device.

In step 502, method 500 can include generating cryptographic data and a corresponding CRC value. In general, step 502 can include any and all operations described in step 202 and step 204 of FIG. 2. Indeed, a customer device may execute step 502 and generate any type of cryptographic data and generate its own CRC value using the cryptographic data. Notably, in most implementations, the choice of CRC algorithm in step 502 should correspond to the CRC algorithm used in step 204 (and step 404) to ensure consistency.

In step 504, method 500 can include signing the command. In some implementations, the command (and data thereto) must be signed by the current owner of a key stored in the memory device. For example, the command must be signed by the holder of a private key corresponding to the public key stored in the memory device. As an example, if the current public key of the memory device was generated by a KMS, the customer must first obtain a signature for the command by the KMS (which is generated using the KMS's private key). The customer can authenticate to the KMS (and provide a device identifier of the memory device), provide the command, and receive this signature. In some implementations, the KMS can be configured to manage the customer's keys and thus can persist the customer-generated public key (and optional CRC value) in its own HSM or similar storage module. In some implementations, step 504 may be optional.

In step 506, method 500 can include issuing the command to the memory device to attempt to write the cryptographic data to the memory device. Details on the operations performed by the memory device in response to the command issued in step 506 were provided in FIG. 4 and are not described herein.

In step 508, method 500 receives a response from the memory device The response may be a success or failure response indicating whether the command was successful. In some implementations, the command is successful if the memory device has written the cryptographic data in the command from step 506 (including both new writes as well as overwriting an existing cryptographic data). In some implementations, a command fails if the memory device does not write the cryptographic data for some reason. As discussed more in FIG. 4, one such reason is that the CRC value cannot be validated. Other reasons may also raise failures including command malformation, cryptographic data length errors, etc.

In step 510, method 500 can include determining if the response indicates a success or failure. If the injection was successful, method 500 can end. However, if the injection failed, method 500 can proceed to step 512 where method 500 can include repairing the cryptographic data and/or aborting the injection.

As discussed above, a failure can arise under many conditions, however one such condition is that the CRC value provided in the command cannot be validated. As discussed in FIG. 4, the memory device recomputes its own CRC value to confirm that the data it has received is valid. If this comparison fails, the command fails, and a failure response is transmitted.

When faced with a failure state, method 500 may take various actions. In one implementation, method 500 can simply abort. In another implementation, method 500 may include displaying an error message (or another indicator) to a human operator to indicate that the command failed. Ultimately, the choice of user interface may be left to the implementation of method 500. In general, however, this option represents an attempt to write the cryptographic data and then prompt for assistance if the write fails. As another alternative, method 500 can attempt to perform various corrections on the cryptographic data and re-execute. For example, method 500 can change the Endianness of the cryptographic data and re-execute. Such common errors may be enumerated and method 500 re-executed for each type of error.

By contrast, in another implementation, method 500 may generate new cryptographic data and return to step 502 and effectively re-execute itself. That is, method 500 can generate new cryptographic data and a new CRC value and attempt to write the new cryptographic data and CRC value to the memory device using the foregoing process. In some implementations, method 500 can re-execute like this until a successful response is received. However, in other implementations, method 500 may only re-execute itself a limited number of times. For example, method 500 may only attempt to request new cryptographic data and write this new cryptographic data five times. Generally, sporadic errors in the cryptographic data or CRC value are likely caused by corruption (e.g., Endianness switch) during network transmission or command transmissions and are very unlikely. Thus, in practice, method 500 may only need re-execute once to successfully write the cryptographic data. However, if repeated errors occur, such errors may be caused by more fundamental errors in the process (e.g., Endianness errors). In such a scenario, part of the foregoing processes includes a bug or other flaw that needs to be addressed. As such, method 500 may only re-execute a fixed number of times before ending (and alerting a user of a potential fault in the system).

Figure 6:
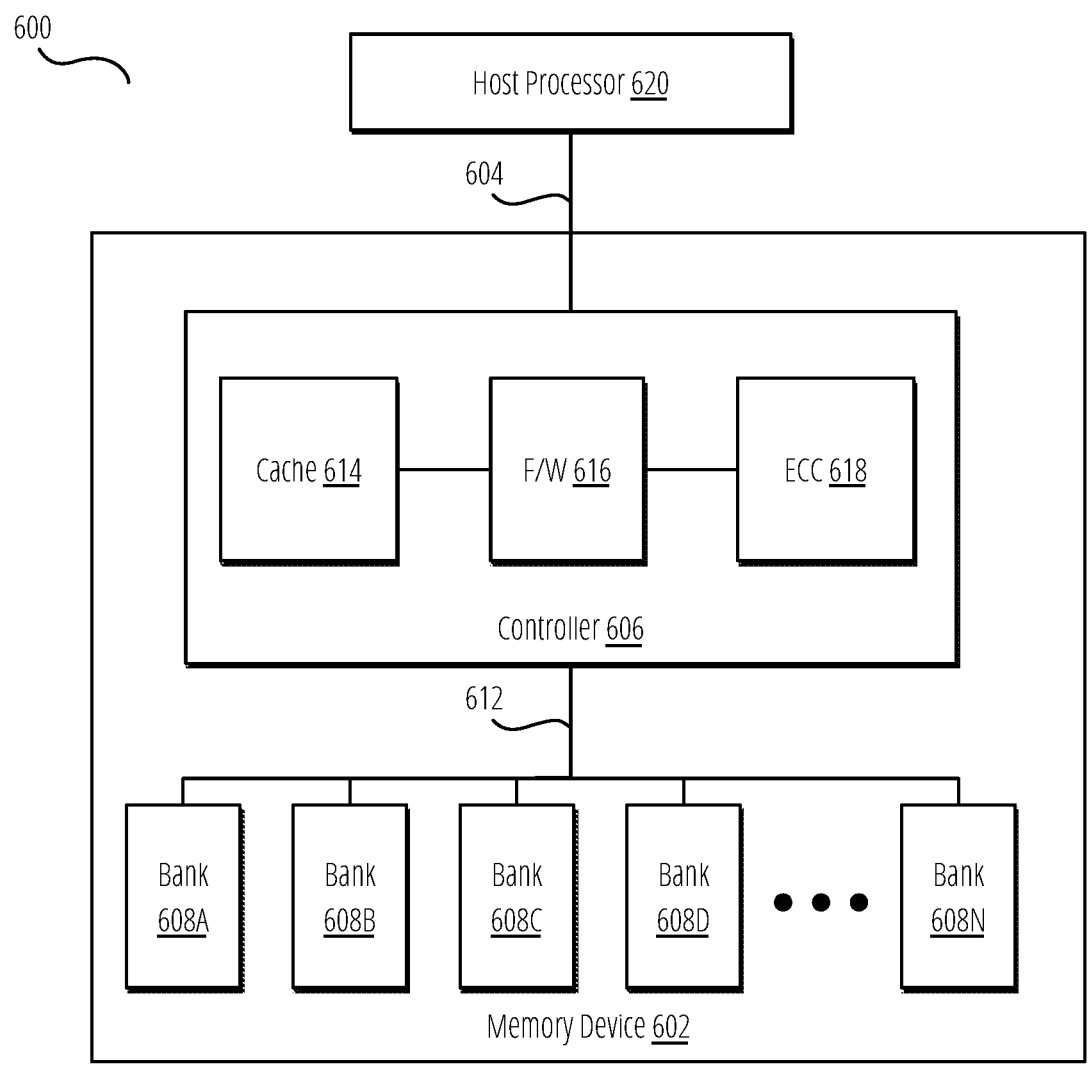
FIG. 6 is a block diagram illustrating a computing system.

FIG. 6 is a block diagram illustrating a computing system.

As illustrated in FIG. 6, a computing system 600 includes a host processor 620 communicatively coupled to a memory device 602 via a bus 604. The memory device 602 comprises a controller 606 communicatively coupled to one or more memory banks (e.g., bank 608A, bank 608B, bank 608C, bank 608D, bank 608N, etc.), forming a memory array via an interface 612. As illustrated, the controller 606 includes a local cache 614, firmware 616, and an ECC module 618.

In the illustrated embodiment, host processor 620 can comprise any type of computer processors, such as a central processing unit (CPU), graphics processing unit (GPU), or other types of general-purpose or special-purpose computing devices. The host processor 620 includes one or more output ports that allow for the transmission of address, user, and control data between the host processor 620 and the memory device 602. In the illustrated embodiment, this communication is performed over bus 604. In one embodiment, the bus 604 comprises an input/output (I/O) bus or a similar type of bus.

The memory device 602 is responsible for managing one or more memory banks (e.g., bank 608A, bank 608B, bank 608C, bank 608D, bank 608N, etc.). In one embodiment, the memory banks (e.g., bank 608A, bank 608B, bank 608C, bank 608D, bank 608N, etc.) comprise NAND Flash dies or other configurations of non-volatile memory. In one embodiment, the memory banks (e.g., bank 608A, bank 608B, bank 608C, bank 608D, bank 608N, etc.) comprise a memory array.

The memory banks (e.g., bank 608A, bank 608B, bank 608C, bank 608D, bank 608N, etc.) are managed by controller 606. In some embodiments, the controller 606 comprises a computing device configured to mediate access to and from banks (e.g., bank 608A, bank 608B, bank 608C, bank 608D, bank 608N, etc.). In one embodiment, the controller 606 comprises an ASIC or other circuitry installed on a printed circuit board housing the memory banks (e.g., bank 608A, bank 608B, bank 608C, bank 608D, bank 608N, etc.). In some embodiments, the controller 606 may be physically separate from the memory banks (e.g., bank 608A, bank 608B, bank 608C, bank 608D, bank 608N, etc.). The controller 606 communicates with the memory banks (e.g., bank 608A, bank 608B, bank 608C, bank 608D, bank 608N, etc.) over interface 612. In some embodiments, this interface 612 comprises a physically wired (e.g., traced) interface. In other embodiments, interface 612 comprises a standard bus for communicating with memory banks (e.g., bank 608A, bank 608B, bank 608C, bank 608D, bank 608N, etc.).

The controller 606 comprises various modules, including local cache 614, firmware 616, and ECC module 618. In one embodiment, the various modules (e.g., local cache 614, firmware 616, and ECC module 618) comprise various physically distinct modules or circuits. In other embodiments, the modules (e.g., local cache 614, firmware 616, and ECC module 618) may completely (or partially) be implemented in software or firmware.

As illustrated, firmware 616 comprises the core of the controller and manages all operations of controller 606. The firmware 616 may implement some or all of the methods described above. Specifically, firmware 616 may implement the methods described in the foregoing figures.

Figure 7:
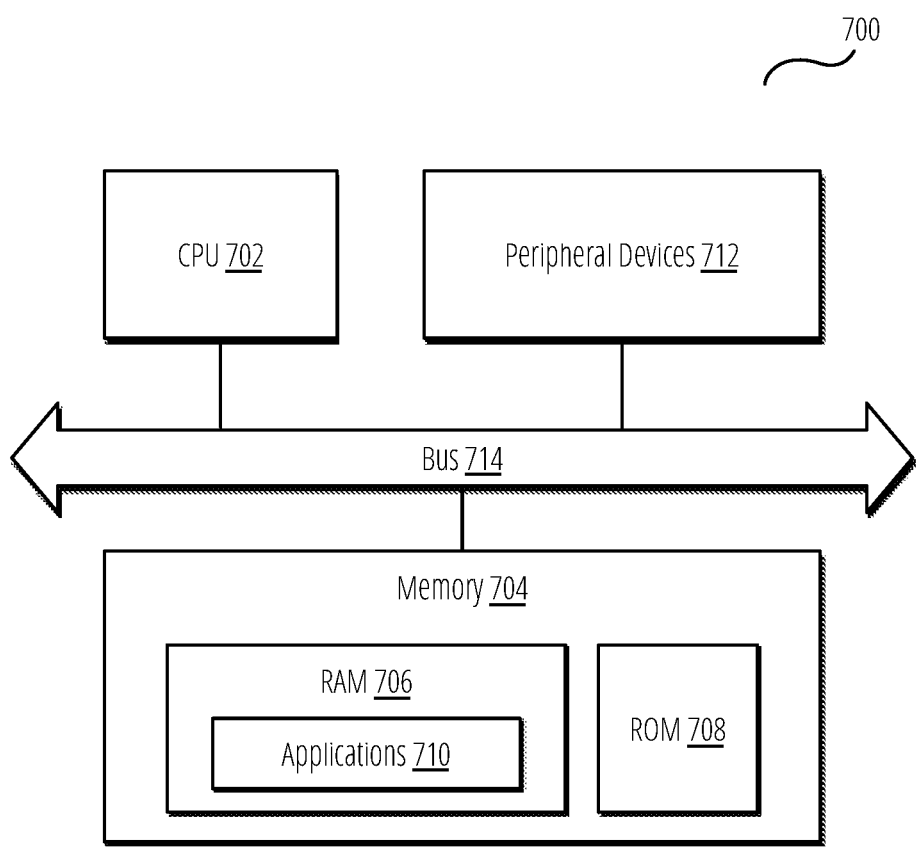
FIG. 7 is a block diagram of a computing device.

FIG. 7 is a block diagram of a computing device.

As illustrated, the device 700 includes a processor or central processing unit (CPU) such as CPU 702 in communication with a memory 704 via a bus 714. The device also includes one or more input/output (I/O) or peripheral devices 712. Examples of peripheral devices include, but are not limited to, network interfaces, audio interfaces, display devices, keypads, mice, keyboards, touch screens, illuminators, haptic interfaces, global positioning system (GPS) receivers, cameras, or other optical, thermal, or electromagnetic sensors.

In some embodiments, the CPU 702 may comprise a general-purpose CPU. The CPU 702 may comprise a single-core or multiple-core CPU. The CPU 702 may comprise a system-on-a-chip (SoC) or a similar embedded system. In some embodiments, a graphics processing unit (GPU) may be used in place of, or in combination with, a CPU 702. Memory 704 may comprise a memory system including a dynamic random-access memory (DRAM), static random-access memory (SRAM), Flash (e.g., NAND Flash), or combinations thereof. In one embodiment, bus 714 may comprise a Peripheral Component Interconnect Express (PCIe) bus. In some embodiments, bus 714 may comprise multiple busses instead of a single bus.

Memory 704 illustrates an example of a non-transitory computer storage media for the storage of information such as computer-readable instructions, data structures, program modules, or other data. Memory 704 can store a basic input/output system (BIOS) in read-only memory (ROM), such as ROM 708, for controlling the low-level operation of the device. The memory can also store an operating system in random-access memory (RAM) for controlling the operation of the device.

Applications 710 may include computer-executable instructions that, when executed by the device, perform any of the methods (or portions of the methods) described previously in the description of the preceding figures. In some embodiments, the software or programs implementing the method embodiments can be read from a hard disk drive (not illustrated) and temporarily stored in RAM 706 by CPU 702. CPU 702 may then read the software or data from RAM 706, process them, and store them in RAM 706 again.

The device may optionally communicate with a base station (not shown) or directly with another computing device. One or more network interfaces in peripheral devices 712 are sometimes referred to as a transceiver, transceiving device, or network interface card (NIC).

An audio interface in peripheral devices 712 produces and receives audio signals such as the sound of a human voice. For example, an audio interface may be coupled to a speaker and microphone (not shown) to enable telecommunication with others or generate an audio acknowledgment for some action. Displays in peripheral devices 712 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 712 may comprise any input device arranged to receive input from a user. An illuminator in peripheral devices 712 may provide a status indication or provide light. The device can also comprise an input/output interface in peripheral devices 712 for communication with external devices, using communication technologies, such as USB, infrared, Bluetooth®, or the like. A haptic interface in peripheral devices 712 provides tactile feedback to a user of the client device.

A GPS receiver in peripheral devices 712 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 6, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

These computer program instructions can be provided to a processor of a general purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and, as such, are not to be limited by the foregoing exemplary embodiments and examples. In other words, functional elements being performed by single or multiple components, in various combinations of hardware and software or firmware, and individual functions, may be distributed among software applications at either the client level or server level, or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software, or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

I claim:

1. A system comprising:
a memory device including a secure storage area;
a server configured to generate cryptographic data and compute a cyclical redundancy check (CRC) value of the cryptographic data; and
a manufacturer computing device configured to receive the cryptographic data and the CRC value and issue a command including the cryptographic data and the CRC value to the memory device,
wherein the memory device is configured to compute a local CRC value using the cryptographic data in the command, compare the local CRC value to the CRC value, and write the cryptographic data to the secure storage area when the local CRC value matches the CRC value.

2. The system of claim 1, wherein the cryptographic data comprises a cryptographic key.

3. The system of claim 1, wherein the manufacturer computing device is further configured to detect a failure response associated with the command, request second cryptographic data and a second CRC value from the server in response to the failure response, and issue a second command including the second cryptographic data and the second CRC value to the memory device.

4. The system of claim 1 further comprising a customer computing device, the customer computing device configured to:
generate second cryptographic data and a second CRC value corresponding to the second cryptographic data; and
issue a second command including the second cryptographic data and the second CRC value to the memory device;
wherein the memory device is configured to compute a second local CRC value using the second cryptographic data in the second command, compare the second local CRC value to the second CRC value, and write the second cryptographic data to the secure storage area if the second local CRC value is equal to the second CRC value.

5. The system of claim 4, wherein the customer computing device is further configured to include a signature in the second command.

6. The system of claim 4, wherein writing the second cryptographic data to the secure storage area comprises overwriting existing cryptographic data.

7. The system of claim 1, wherein the memory device is further configured to determine that the local CRC value does not match the CRC value and, in response, not write the cryptographic data to the secure storage area.

8. The system of claim 7, wherein the memory device returns a failure response in response to determining that the local CRC value does not match the CRC value.

9. A method comprising:
- receiving, by a memory device, a command including cryptographic data and a CRC value of the cryptographic data;
- generating, by the memory device, a local CRC value using the cryptographic data;
- determining, by the memory device, whether the local CRC value matches the CRC value included in the command;
- writing, by the memory device, the cryptographic data to a secure storage area if the local CRC value matches the CRC value included in the command; and
- returning, by the memory device, a failure response if the local CRC value does not match the CRC value included in the command.

10. The method of claim 9, wherein the cryptographic data comprises one of a public key, a private key, a symmetric key, and a Unique Device Secret.

11. The method of claim 9, wherein determining whether the local CRC value matches the CRC value included in the command comprises determining if the local CRC value is equal to the CRC value included in the command.

12. The method of claim 9, wherein writing the cryptographic data to a secure storage area comprises overwriting existing cryptographic data stored in the secure storage area.

13. The method of claim 12, further comprising extracting a digital signature from the command and validating the digital signature using the existing cryptographic data.

14. The method of claim 9, wherein returning a failure response comprises returning failure response data as part of the failure response.

15. A non-transitory computer-readable storage medium for tangibly storing computer program instructions capable of being executed by a computer processor, the computer program instructions defining steps of:
- receiving, by a memory device, a command including cryptographic data and a CRC value of the cryptographic data;
- generating, by the memory device, a local CRC value using the cryptographic data;
- determining, by the memory device, whether the local CRC value matches the CRC value included in the command;
- writing, by the memory device, the cryptographic data to a secure storage area if the local CRC value matches the CRC value included in the command; and
- returning, by the memory device, a failure response if the local CRC value does not match the CRC value included in the command.

16. The non-transitory computer-readable storage medium of claim 15, wherein the cryptographic data comprises one of a public key, a private key, a symmetric key, and a Unique Device Secret.

17. The non-transitory computer-readable storage medium of claim 15, wherein determining whether the local CRC value matches the CRC value included in the command comprises determining if the local CRC value is equal to the CRC value included in the command.

18. The non-transitory computer-readable storage medium of claim 15, wherein writing the cryptographic data to a secure storage area comprises overwriting existing cryptographic data stored in the secure storage area.

19. The non-transitory computer-readable storage medium of claim 18, further comprising extracting a digital signature from the command and validating the digital signature using the existing cryptographic data.

20. The non-transitory computer-readable storage medium of claim 15, wherein returning a failure response comprises returning failure response data as part of the failure response.

\* \* \* \* \*